United States Patent
Fambach et al.

(10) Patent No.: US 8,727,087 B2
(45) Date of Patent: May 20, 2014

(54) TORQUE TRANSMISSION ARRANGEMENT, PARTICULARLY HYDRODYNAMIC TORQUE CONVERTER

(75) Inventors: Ralf Fambach, Schonungen (DE); Georg Mencher, Grafenrheinfeld (DE); Gregor Sueck, Coesfeld (DE); Andreas Grell, Schweinfurt (DE); Michael Heuler, Würzburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 170 days.

(21) Appl. No.: 13/369,196

(22) Filed: Feb. 8, 2012

(65) Prior Publication Data

US 2013/0037368 A1 Feb. 14, 2013

(30) Foreign Application Priority Data

Feb. 9, 2011 (DE) .......................... 10 2011 003 846

(51) Int. Cl.
*F16H 45/02* (2006.01)
*F16D 25/0638* (2006.01)
*F16D 25/12* (2006.01)

(52) U.S. Cl.
USPC .......................... 192/3.3; 192/3.29; 192/85.24

(58) Field of Classification Search
USPC .................................................. 192/3.29, 3.3
See application file for complete search history.

(56) References Cited

U.S. PATENT DOCUMENTS

| | | | |
|---|---|---|---|
| 4,049,093 A * | 9/1977 | Vukovich et al. .............. | 192/3.3 |
| 7,143,880 B2 | 12/2006 | Tsuzuki et al. | |
| 2002/0033310 A1* | 3/2002 | Sasse et al. .................. | 192/3.29 |
| 2008/0142325 A1* | 6/2008 | Degler et al. ................. | 192/3.29 |
| 2010/0059324 A1* | 3/2010 | Biermann ..................... | 192/3.29 |
| 2011/0120829 A1* | 5/2011 | Vanni et al. ................... | 192/3.29 |
| 2012/0205212 A1* | 8/2012 | Fambach et al. ............. | 192/3.29 |

FOREIGN PATENT DOCUMENTS

DE 197 80 552 10/1998

* cited by examiner

*Primary Examiner* — Richard M. Lorence
(74) *Attorney, Agent, or Firm* — Cozen O'Connor (57) ABSTRACT

A torque transmission includes a housing arrangement drivable around an axis of rotation and filled with fluid and a clutch arrangement between the housing arrangement and a driven member. The clutch arrangement has a first friction surface formation rotatable with the housing arrangement and a second friction surface formation rotatable with the driven member. A clutch piston is movable axially for producing and canceling frictional engagement of the first and the second friction surface formation. A piston carrying element is connected to the clutch piston on the radially inner side for axial movement of the clutch piston. The piston carrying element has in its radially inner end region a first axial supporting area for axially supporting the driven member at the piston carrying element and a second axial supporting area for supporting the piston carrying element at the housing arrangement.

14 Claims, 7 Drawing Sheets

TORQUE TRANSMISSION ARRANGEMENT, PARTICULARLY HYDRODYNAMIC TORQUE CONVERTER

BACKGROUND OF THE INVENTION

1. Field of the Invention

The present invention relates to a torque transmission arrangement, particularly a hydrodynamic torque converter, comprising a housing arrangement drivable for rotation around an axis of rotation and is filled or fillable with fluid, a clutch arrangement in the torque transmission path between the housing arrangement and a driven member, which clutch arrangement has a first friction surface formation rotatable with the housing arrangement and a second friction surface formation rotatable with the driven member, a clutch piston movable axially for producing and canceling a frictional engagement of the first friction surface formation with the second friction surface formation, and a piston carrying element connected in a substantially fluid-tight manner to the clutch piston on the radially inner side and which permits an axial movement of the clutch piston.

2. Description of the Related Art

A torque transmission arrangement of the type mentioned above which is constructed as a hydrodynamic torque converter is known from U.S. Pat. No. 7,143,880 B2. In this known torque transmission arrangement, an annularly formed piston that is displaceable for engaging and disengaging a lockup clutch is supported and guided in its radially outer area at an outer disk carrier in an axially movable and fluid-tight manner. In its radially inner area, the clutch piston is supported in an axially movable and fluid-tight manner and guided for axial movement, respectively, at a likewise annularly formed piston carrying element and at the outer circumferential surface thereof, respectively. This piston carrying element is connected to a housing shell of the housing arrangement for rotating jointly by welding. In its radially inner area, the piston carrying element is held at an axial distance from this housing shell and, at that location, also axially supports the driven member which serves to transfer torque and which is provided in the form of a turbine hub. In order to obtain a fluid-tight connection of the clutch piston to the piston carrying element, the clutch piston has a circumferential groove in its inner circumferential surface located radially opposite the outer circumferential surface of the piston carrying element, an annular sealing element being received in this circumferential groove.

SUMMARY OF THE INVENTION

It is an object of the present invention to provide a torque transmission arrangement, particularly hydrodynamic torque converter, having an improved operating behavior and is constructed in a simple manner.

According to one embodiment of the invention, a torque transmission arrangement, particularly hydrodynamic torque converter, comprising a housing arrangement which is drivable for rotation around an axis of rotation and is filled or fillable with fluid, a clutch arrangement in the torque transmission path between the housing arrangement and a driven member, which clutch arrangement has a first friction surface formation rotatable with the housing arrangement and a second friction surface formation rotatable with the driven member, a clutch piston movable axially for producing and canceling a frictional engagement of the first friction surface formation with the second friction surface formation, and a piston carrying element connected in a substantially fluid-tight manner to the clutch piston on the radially inner side and which permits an axial movement of the clutch piston.

The piston carrying element has in its radially inner end region a first axial supporting area for axially supporting the driven member at the piston carrying element and a second axial supporting area for supporting the piston carrying element at the housing arrangement.

In the construction according to one embodiment of the invention, the piston carrying element is constructed in its radially inner area not only for axially supporting the driven member but also in such a way that the piston carrying element itself can be supported, or is supported, axially with respect to the housing arrangement. A defined position is maintained even when very large axial loads act on the driven member. This is advantageous particularly when the driven member is coupled with a turbine of a hydrodynamic torque converter or a fluid coupling or the like on which substantial axial loads can be exerted particularly during torque converting operation or torque transmitting operation, which axial loads can lead to a displacement in the absence of support and, therefore, to an impairment of the torque transmitting capability.

In one embodiment the piston carrying element is constructed with a substantially cylindrical portion in its radially inner end region, and the first axial supporting area is provided in a first axial end region of the substantially cylindrical portion, and the second axial supporting area is provided in a second axial end region of the substantially cylindrical portion. This design can be achieved in a particularly simple manner when the substantially cylindrical portion is formed by shaping a sheet metal structural component part.

To ensure the supply of fluid to the interior space of the housing arrangement, particularly a space area containing a turbine, it is proposed that a first fluid passage channel arrangement is provided in the region of the first axial supporting area at the piston carrying element and/or at the driven member and/or at a bearing supporting the driven member axially at the piston carrying element.

A space area to be filled with fluid or emptied of fluid for the axial displacement of the clutch piston can be supplied with fluid in a particularly simple manner when a second fluid passage channel arrangement is provided in the region of the second axial supporting area at the piston carrying element and/or at the housing arrangement.

In another embodiment form which can be realized in a very simple construction, it can be provided that the piston carrying element is produced substantially in its entirety from plastics material.

The construction of the piston carrying element from plastics material is particularly advantageous because very low friction coefficients and, therefore, an easy rotatability of structural component parts supported axially with respect to the piston carrying element can also be ensured simultaneously through the choice of plastics material.

In order to ensure a fluid-tight connection to different component assemblies, particularly the clutch piston or a transmission input shaft or the like, in the area of the piston carrying element, it is suggested that the piston carrying element has a sealing element receiving cutout in its radially inner end region and/or in its radially outer end region.

In a particularly advantageous variant, it can be provided that the piston carrying element is not connected to the housing arrangement by melt joining. Avoidance of melt joining, i.e., a joint generally obtained by welding, ensures the prevention of a deformation of the housing arrangement brought about by excessive application of heat.

To ensure that the piston carrying element is connected to the housing arrangement so as to be fixed with respect to rotation relative to it, these two structural component assemblies can be connected for jointly rotating around the axis of rotation by positive engagement.

To this end, it can be provided, for example, that rotational coupling members are provided at the housing arrangement which engage in rotational coupling cutouts in the piston carrying element.

A very stable positive engagement coupling can be achieved by a toothing formation provided at the housing arrangement, and in that a mating toothing formation in a rotational coupling engagement with the toothing formation is provided at the piston carrying element. In a variant which is realized by a very simple construction, the toothing engagement can be achieved very easily in that the piston carrying element is constructed in its radially inner end region substantially cylindrically and with the mating toothing formation.

In an alternative variant, it can be provided that the piston carrying element is supported axially at the housing arrangement and is connected to the latter in circumferential direction by frictional engagement. In this case, it is unnecessary to provide any structural steps for obtaining a rotational connection of the piston carrying element to the housing arrangement.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be described in the more detail in the following with reference to the accompanying drawings. The drawings show.

DETAILED DESCRIPTION OF THE PRESENTLY PREFERRED EMBODIMENTS

Figure 1:
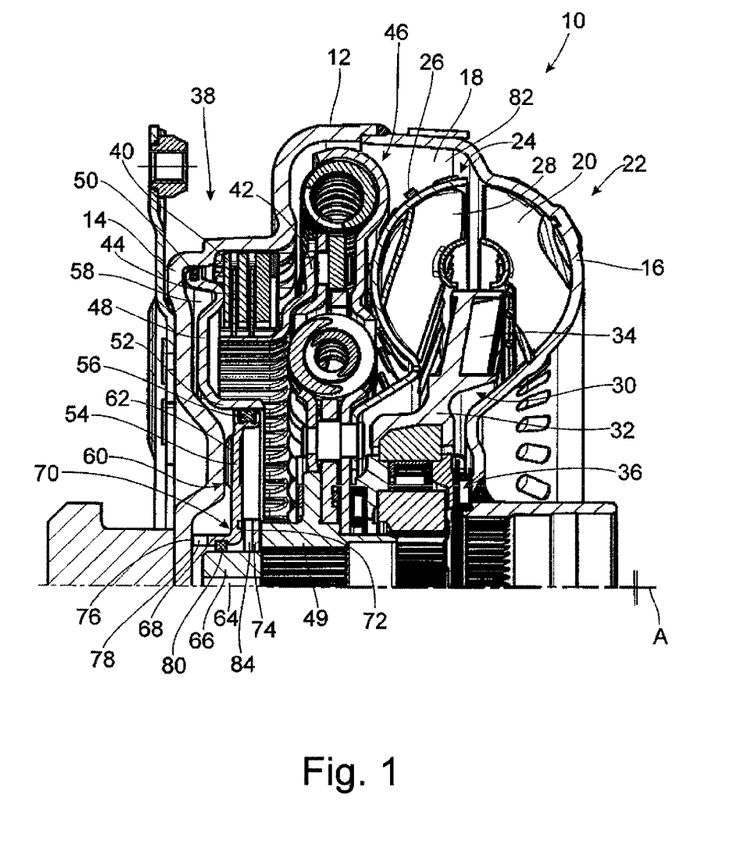
FIG. 1 is a partial longitudinal section through a torque transmission arrangement constructed as a hydrodynamic torque converter.

A torque transmission arrangement constructed in the form of a hydrodynamic torque converter is designated generally by 10 in FIG. 1. This torque transmission arrangement 10 comprises a housing 12 having a housing shell 14 positioned on the drive side, i.e., engine side, and a housing shell 16 positioned on the driven side, i.e., transmission side. These housing shells 14, 16 are fixedly connected to one another in a fluid-tight manner on the radially outer side, for example, by welding, so as to form an interior space 18 which is closed in a fluid-tight manner.

A plurality of impeller vanes 20 arranged successively in circumferentially around an axis of rotation A is supported at the housing shell 16 so that the housing shell 16, or housing 12 generally, also provides an impeller 22. A turbine 24 having a plurality of turbine vanes 28 supported successively in circumferential direction around the axis of rotation A at a turbine shell 26 is provided in the interior space 18. A stator 30 is located between the impeller 22 and the turbine 24 and has a stator ring 32 which carries a plurality of stator vanes 34 successively in circumferential direction and is supported on a supporting hollow shaft, by a freewheeling arrangement 36 so as to be rotatable in one direction around the axis of rotation A.

A lockup clutch 38 comprises a plurality of disk-like friction elements 40 connected to the housing shell 14 so as to be fixed with respect to rotation but axially movable relative to it. These friction elements 40 provide a first friction surface formation. A plurality of disk-like friction elements 44 connected to a friction element carrier 42 so as to be fixed with respect to rotation but axially movable relative to it provide a second friction surface formation which is connected by a torsional vibration damper arrangement 46 to a driven member 49 which is provided in the form of a hub.

The torsional vibration damper arrangement 46 is preferably constructed in two stages with two torsional vibration dampers that act in series and are arranged in a radially staggered manner. The friction element carrier 42 is connected to the primary side of the radially outer torsional vibration damper of the two torsional vibration dampers, this primary side being constructed as a central disk element. The damper springs of these torsional vibration dampers transmit the torque to two cover disk elements which are held at an axial distance from one another and which form the secondary side of the first torsional vibration damper in their radially outer area and the primary side of the second torsional vibration damper in their radially inner area. The damper springs of the second torsional vibration damper transmit torque to the driven member 49 via a central disk element providing the secondary side of the second torsional vibration damper. The turbine shell 26 is fixedly connected to the two cover disk elements by riveting or the like and, together with the latter, provides an intermediate mass between the two spring assemblies of the two torsional vibration dampers.

It should be noted in this connection that the torsional vibration damper arrangement 46 shown in FIG. 1 and the lockup clutch 38 can be constructed in different ways. It is also possible, of course, to connect the second friction surface formation 44 to the driven member 49 directly, i.e., without the intermediary of a torsional vibration damper arrangement.

An annularly formed clutch piston 48 is provided in the interior space 18 of the housing 12 in order to press the two friction surface formations, i.e., friction elements 40 and 44, into a mutual frictional engagement. This clutch piston 48 is guided on the radially outer side at an inner circumferential surface area of the housing shell 14 so as to be axially movable and, by inserting an annular sealing element 50, also fluid-tight. On the radially inner side, the clutch piston 48 is guided by a substantially cylindrical portion 52 in a fluid-tight manner on a piston carrying element 54. This piston carrying element 54 is constructed in its outer circumferential area with an annular sealing element 56 so that a space area 58 which is closed so as to be substantially fluid-tight is formed between the clutch piston 48 and the housing shell 14. This space area 58 opens toward the radially inner side through a channel arrangement 60. In the depicted example, this channel arrangement 60 is provided by a plurality of axial shaped portions 62 formed at the piston carrying element 54 and cutouts formed between the axial shaped portions 62.

Fluid can be supplied to the space area 58 via a central opening 64 in a transmission input shaft 66, only an end region thereof being shown here, so that the clutch piston 48 can be displaced axially by increasing the fluid pressure in the space area 58 in order to bring the two friction surface formations into frictional engagement and, therefore, to bring the lockup clutch 38 into its engaged state.

The piston carrying element 54 is angled axially in its radially inner area, i.e., has a substantially cylindrical portion 68. With this substantially cylindrical portion 68, the piston carrying element 54 forms a first axial supporting area 72 in its radially inner end region 70, the driven member 49 being axially supported or axially supportable therein by an annular bearing element 74. At the other axial end, the piston carrying element 54 with this substantially cylindrical portion 68 forms a second axial supporting area 76 in which the piston carrying element 54 is supported axially with respect to the housing 12. In this second axial supporting area 76, the substantially cylindrical portion 68 has one or more through-openings 78 to allow fluid to pass to and from the space area 58. Further, an inner circumferential groove is provided in the substantially cylindrical portion 68, and an annular sealing element 80 producing a fluid-tight connection to the transmission input shaft 66 is positioned in this inner circumferential groove.

To supply fluid to the space area 82 containing the turbine 24, the annular bearing element 74 can be formed with one or more radial through-openings 84 which can be constructed as grooves which open to one axial side, in this case the side of the piston carrying element 54.

Figure 2:
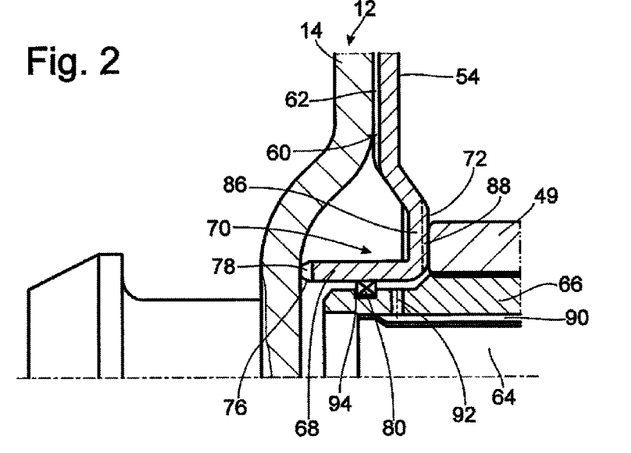
FIG. 2 is an enlarged detail of the radially inner area of a torque transmission arrangement.

A modified embodiment form is illustrated in FIG. 2 showing only the radially inner area of the piston carrying element 54 and the system areas cooperating with it which are relevant for the description of the invention. It will be seen that the driven member 49 directly contacts the first axial supporting area 72. Axial shaped portions 86 are formed at the piston carrying element 54 in the region of the first axial supporting area 72. Through-openings 88, indicated by dashed lines in FIG. 2, which lead radially outward for the passage of fluid, i.e., oil, into the space area 82, are provided between these axial shaped portions 86. This fluid is supplied and removed via the double-walled transmission input shaft 86, i.e., via an annular flow space 90 formed therein, and one or more through-openings 92. In this embodiment form, the annular sealing element 80 is received in an outer circumferential groove 94 of the transmission input shaft 86.

As in the embodiment in FIG. 1, the piston carrying element 54 is axially supported in its radially inner end region 70 at the housing 12 or housing shell 14 by the substantially cylindrical portion 68 providing the two axial supporting areas 72, 76. Lacking any other possibility for the piston carrying element 54 to deform axially on the radially inner side, this allows a defined, stable positioning of the driven member 49 and, therefore, of all of the components coupled therewith, particularly also the turbine, even under the axial loads occurring during operation.

Figure 3:
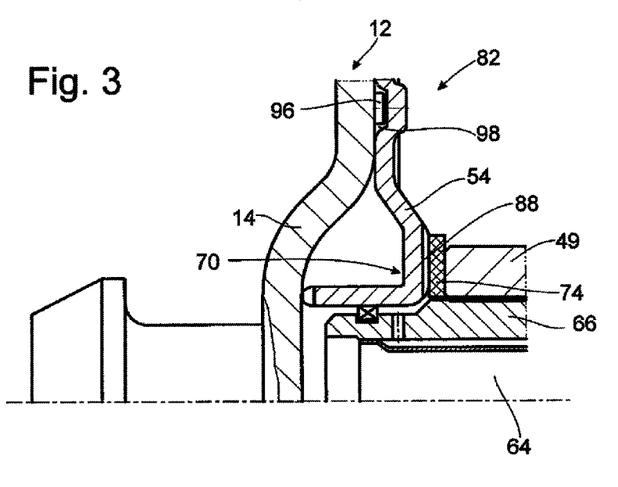
FIG. 3 is a view corresponding to FIG. 2 showing an alternative constructional type.

FIG. 3 shows a modification of the embodiment form from FIG. 2. It will be seen in this case that a rotational coupling projection 96, preferably a plurality of rotational coupling projections 96 in succession in circumferential direction, is provided at the housing shell 14, i.e., at the housing 12, by stamped portions or the like. Corresponding rotational coupling cutouts 98 in which the rotational coupling projections 96 engage are provided at the piston carrying element 54. In this way it is ensured that the housing 12 and the piston carrying element 54 are connected so as to be fixed with respect to relative rotation so that no relative rotational movement can occur between these two components. Due to the fact that the piston carrying element 54 is held in its axial position in a defined manner even under loading of the driven member 49, riveting or a melt joining process, i.e., welding, for example, is not required in this case.

It should be noted that, alternatively, the piston carrying element 54 and housing shell 14 can also be connected so as to be fixed with respect to rotation relative to one another by frictional engagement. This can be realized by the axial load generated by the driven member 49 on the piston carrying element 54.

Still referring to FIG. 3, it is noted that the annular disk-shaped bearing element 74 is provided between the piston carrying element 54 and the driven member 49. In this case, openings 88 in the radially inner end region 70 of the piston carrying element 54 allow fluid to pass through into the space area 82.

Figure 4:
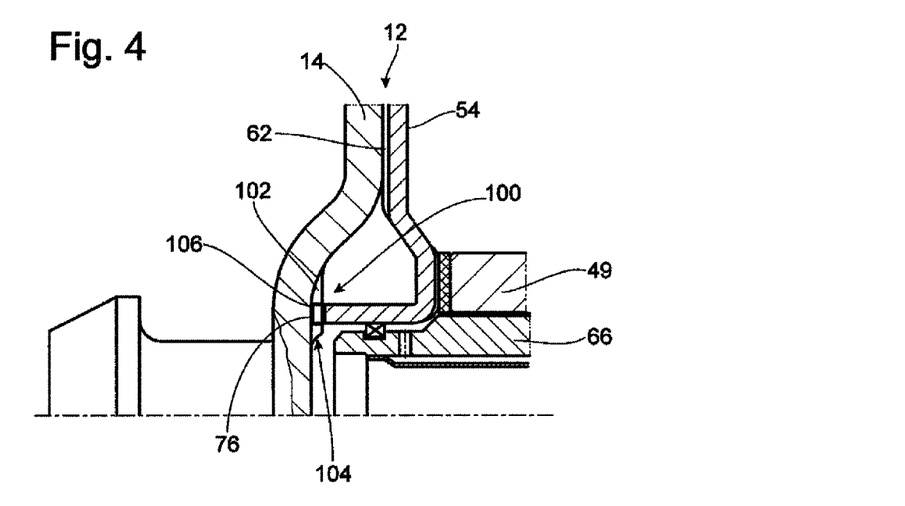
FIG. 4 is a view corresponding to FIG. 2 showing an alternative constructional type.

FIG. 4 shows an alternative type of construction for rotational coupling of the piston carrying element 54 with the housing shell 14 of the housing 12. It will be seen in this case that a plurality of rotational coupling projections 102 which, for example, provide a toothing 100 is provided at the housing shell 14. Corresponding rotational coupling projections 106 providing a toothing formation 104 are provided at the second axial supporting area 76 so that a tooth-like rotational coupling engagement is realized between the housing shell 14 and the piston carrying element 54 in this case also.

The coupling of the piston carrying element 54 to the housing shell 14 has the advantage, owing to the piston carrying element, in particular the axial shaped portions 62 thereof, rotating in a defined manner with the housing shell 14, that the fluid present in this area is guided in radial direction in a defined manner. As a result, fewer pressure losses occur or must be overcome in the flow into the transmission input shaft 66, which allows a faster disengagement and also, of course, a faster engagement of the clutch.

Figure 5:
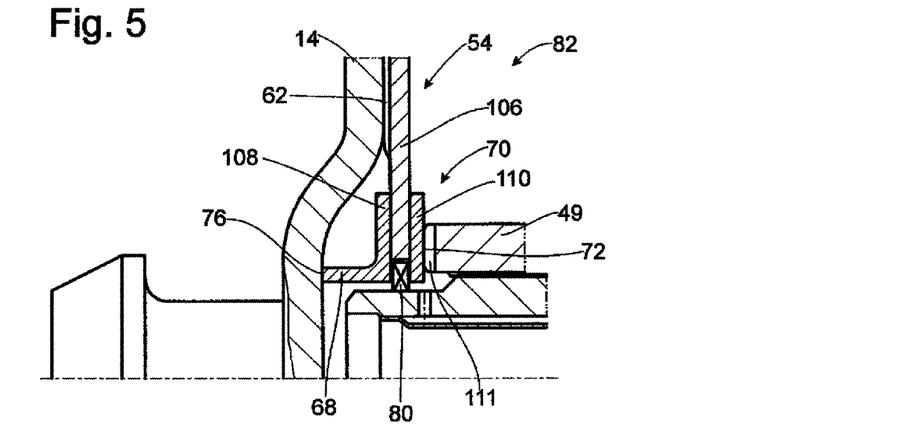
FIG. 5 is a view corresponding to FIG. 2 showing an alternative constructional type.

FIG. 5 shows another alternative embodiment form. In this case, the piston carrying element 54 is constructed particularly in its radially inner area with a plurality of annular disks in axial succession which are fixedly connected to one another, for example, by riveting or the like. A central disk 106 extends radially outward also for interaction with the clutch piston and has axial shaped portions 62. This central disk 106 can be fashioned from sheet metal material, for example.

In the radially inner end region 70, annular disks 108, 110 which are formed of plastic are located on both sides of the central disk 106. These annular disks 108, 110 project radially inward beyond the central disk 106 and accordingly form the circumferential groove for receiving the annular sealing element 80. The first axial supporting area 72 is provided at and by the annular disk 110 that is directly contacted by the driven member 49. In the example shown in the drawing, this driven member 49 has a plurality of openings 111 for the passage of fluid to the space area 82 which are continuous toward the radially outer side and open axially. The second axial supporting area 76 is provided by the annular disk 108 is positioned so as to face the housing 14 and has an L-shaped cross section and therefore provides the substantially axially extending portion 68. The openings 78, not shown in FIG. 5, can also be provided in this substantially cylindrical portion 68 to allow fluid to pass to the space area 58 (see FIG. 1).

The fixed connection between the three disks 106, 108, 110 can be carried out by riveting. Alternatively, it is also possible to realize this connection by gluing, snap-in connections, or the like. Since the two disks 108, 110, particularly disk 110, can be made from plastics material, there is a comparatively low coefficient of friction during relative rotation which occurs primarily or, when the piston carrying element 54 is rotationally coupled with the housing shell 14, exclusively in the region adjoining the driven member 49.

Figure 6:
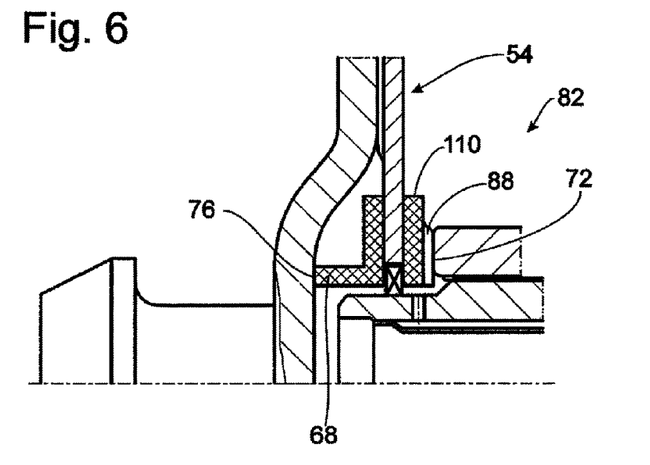
FIG. 6 is a view corresponding to FIG. 2 showing an alternative constructional type.

A modification of this constructional variant is shown in FIG. 6. It will be seen that the openings 88 allow fluid to pass to the space area 82 are realized in the piston carrying element 54, particularly the annular disk 110 providing the first axial supporting area 72.

Figure 7:
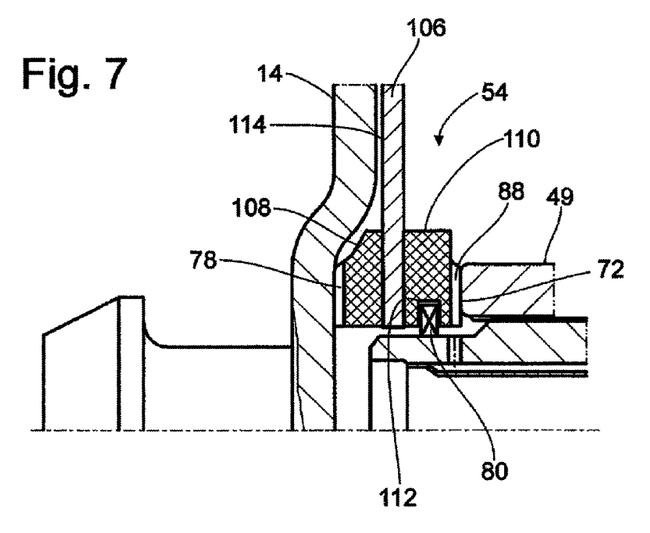
FIG. 7 is a view corresponding to FIG. 2 showing an alternative constructional type.

FIG. 7 shows a variant in which the disk 110, which provides the first axial supporting area 72 and can again be made of plastic material, for example, also provides the inner circumferential groove 112 for receiving the annular sealing element 80. This inner circumferential groove 112 can easily be incorporated in the structural component part made of plastics material. The central disk 106 can terminate on the radially inner side substantially flush with the two disks 108, 110 positioned laterally thereto.

Owing to the very stable support and positioning of the piston carrying element 54 in axial direction between the housing disk 14 and the driven member 49, it is also possible, for example, to dispense with the axial shaped portions 62 of the preceding constructional variants by which the piston carrying element 54 is supported in its radially central area axially with respect to the housing shell 14. Instead, a gap-like intermediate space 114 can be used for guiding fluid radially outward and radially inward. Of course, it is also possible in so doing to realize the positive-engagement rotational coupling shown, for example, in FIG. 3 between the piston carrying element 54, in this case also the disk 106 of the latter, and the housing shell 14.

Particularly in the construction of the piston carrying element having a plurality of disks in its radially inner end region 70, it is possible to integrate various functions in the different structural component parts, particularly the two disks 108, 110 which are preferably made of plastic material, and to optimally configure them for this functionality. For example, it is easily possible to design the entire surface by which these disks 108, 110 are supported at the structural component parts loading them axially, i.e., the housing shell 14 and driven member 49, respectively, in such a way that the surface area pressure excludes overloading. The openings provided for guiding oil radially outward and radially inward can also easily be incorporated in these structural component parts.

As was already mentioned, these three disks can be fixedly connected to one another by gluing or riveting or snap-in connections or through the use of connection pins. In principle, it is also conceivable to provide shaped portions at the central disk 106 that engage in corresponding openings in the disks 108 and/or 110.

Figure 8:
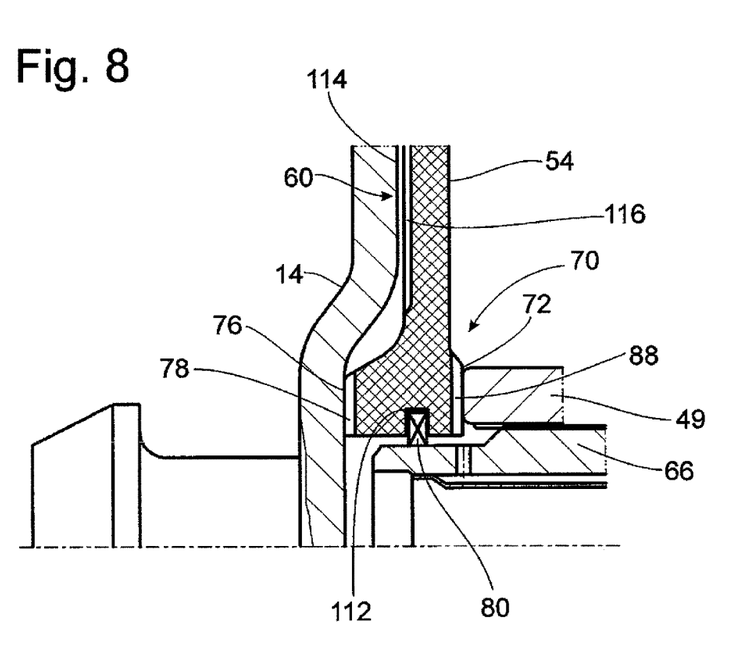
FIG. 8 is a view corresponding to FIG. 2 showing an alternative constructional type.

In the embodiment form shown in FIG. 8, the piston carrying element 54 is made in its entirety from plastics material. The two axial supporting areas 72, 76 are formed in the radially inner end region 70 of the piston carrying element 54 and also have openings 88 and 78 provided therein, respectively, which allow the fluid to pass through radially also when there is axial support at the driven member 49 and housing shell 14. The inner circumferential groove 112 in which the annular sealing element 80 is provided for producing the fluid-tight connection to the transmission input shaft 66 is provided in the inner circumferential surface area of the piston carrying element 54. The channel arrangement 60 which allows fluid to pass radially outward can be realized in this instance by a plurality of groove-like recesses 116 which are incorporated in the piston carrying element 54 and which lead radially outward. Alternatively or in addition it is possible, depending on the defined axial position of the piston carrying element 48, that an axial intermediate space 114 allows or prevents fluid from passing through.

Figure 9:
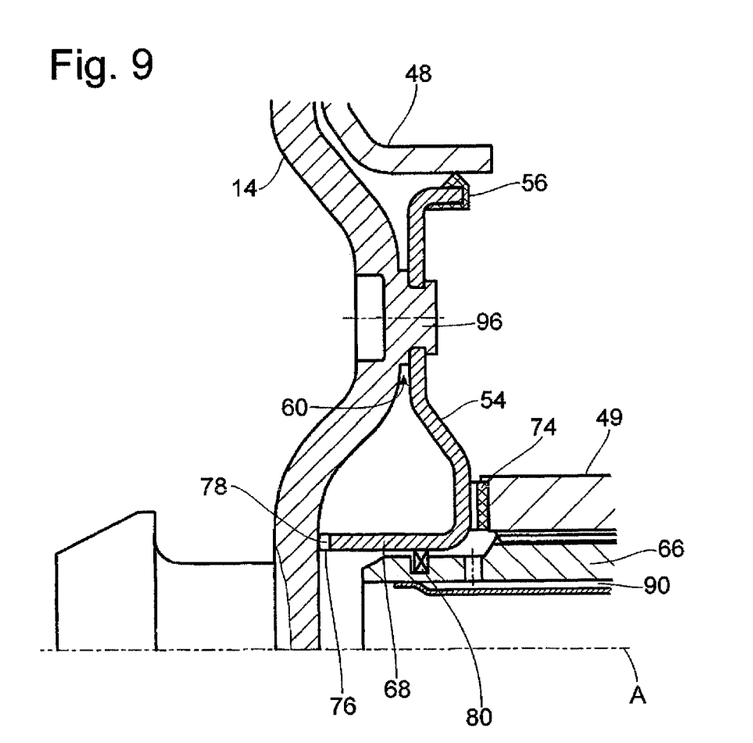
FIG. 9 is a view corresponding to FIG. 2 showing an alternative constructional type.

Another embodiment is shown in FIG. 9. In this case, the piston carrying element 54 is shaped from sheet metal material and carries the sealing element 56 in its radially outer region which is deformed axially away from the housing shell 14. This sealing element 56 can be fixedly vulcanized to the piston element 54 and can sealingly contact the clutch piston 48 by a sealing lip.

In its radially inner region, the piston carrying element is axially supported at the annular supporting element 74 which is in turn axially supported at the driven member 49 and is radially centered with respect to the latter by a radially outwardly projecting shoulder having, e.g., an annular shape.

The piston carrying element 54 is fixedly supported by a plurality of rivet-like rotational coupling projections 96 which are formed integral with the housing shell 14. These projections 96 formed by axial shaped portions of the housing shell 14 also simultaneously form spacers by which the piston carrying element 54 is held at an axial distance from the areas of the housing shell 14 located therebetween in circumferential direction. To this extent, the channel arrangement 60 is realized without undertaking additional steps, for example, groove-like recesses or the like, at any of the structural component parts.

Figure 10:
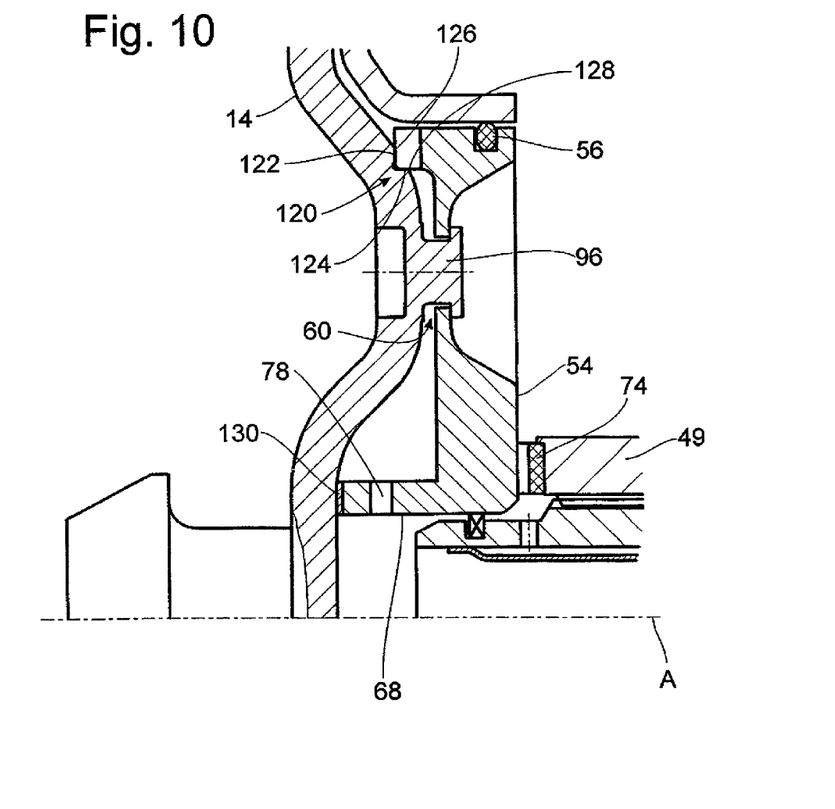
FIG. 10 is a view corresponding to FIG. 2 showing an alternative constructional type.

FIG. 10 shows a constructional variant in which the piston carrying element 54 is constructed as a forged part or cast part. The piston carrying element is again connected to the housing shell 14 for jointly rotating therewith by a plurality of rivet-like rotational coupling projections 96 distributed in circumferential direction and formed by shaped portions of the housing shell 14. In so doing, a defined axial or radial positioning is not substantially achieved by these rotational coupling projections 96 but rather by an axial/radial centering formation 120. The latter comprises a recess which extends in circumferential direction around the axis of rotation A and which has an axial centering surface 122 and a radial centering surface 124. A contact formation constructed in a tooth-like manner or is continuous in circumferential direction is provided at the piston carrying element 54 so as to be associated with these two surfaces 122, 124 and has a corresponding axial centering surface 126 and radial centering surface 128. A defined position of the piston carrying element 54 with respect to the housing cover 14 is predetermined by the surfaces 122, 126, 124, 128 which can be brought into contact with one another in axial direction and in radial direction so that the rivet-like rotational coupling projections 96 actually need only also provide the piston carrying element 54 with a rotational coupling or clamp it in so as to be fixed axially.

In its radially inner area, the piston carrying element 54 is supported by its substantially cylindrical portion 68, possibly with the intermediary of an elastically deformable or adaptable element 130, at the housing shell 14 so that, although the piston carrying element 54 is constructed in a very stable configuration in this case, a defined axial support can be achieved in the radially inner region thereof. Since the support is carried out in this case by means of an element 130 whose shape can be adapted at least slightly, the axial position predetermined by formation 120 is not impaired.

It should be noted that while a formation is provided for axial and radial centering in the construction according to FIG. 10, this centering function can be realized in the other embodiment forms mentioned above by other structural component assemblies, for example, those used for rotational coupling.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A torque transmission arrangement, comprising:
   a housing arrangement drivable for rotation around an axis of rotation and is one of filled or fillable with fluid;
   a clutch arrangement in a torque transmission path between the housing arrangement and a driven member, having:
   a first friction surface formation rotatable with the housing arrangement; and
   a second friction surface formation rotatable with the driven member;
   a clutch piston axially movable to produce and cancel a frictional engagement of the first friction surface formation with the second friction surface formation; and
   a piston carrying element connected in a substantially fluid-tight manner to the clutch piston on a radially inner side that permits an axial movement of the clutch piston, the piston carrying element has in its radially inner end region a first axial supporting area for axially supporting the driven member at the piston carrying element and a second axial supporting area for supporting the piston carrying element at the housing arrangement,
   wherein the piston carrying element comprises a substantially cylindrical portion in its radially inner end region, the first axial supporting area is provided in a first axial end region of the substantially cylindrical portion, and the second axial supporting area is provided in a second axial end region of the substantially cylindrical portion.

2. The torque transmission arrangement according to claim 1, wherein the substantially cylindrical portion is formed by shaping a sheet metal structural component part.

3. The torque transmission arrangement according to claim 1, wherein a first fluid passage channel arrangement is provided in at least one of
   the region of the first axial supporting area at the piston carrying element,
   at the driven member, and
   at a bearing supporting the driven member axially at the piston carrying element.

4. The torque transmission arrangement according to claim 1, wherein a second fluid passage channel arrangement is provided in at least one of the region of the second axial supporting area at the piston carrying element and at the housing arrangement.

5. The torque transmission arrangement according to claim 1, wherein the piston carrying element is a plastic material.

6. The torque transmission arrangement according to claim 1, wherein the piston carrying element has a sealing element receiving cutout in at least one of its radially inner end region and its radially outer end region.

7. The torque transmission arrangement according to claim 1, wherein the piston carrying element is not connected to the housing arrangement by melt joining.

8. The torque transmission arrangement according to claim 7, wherein the piston carrying element is connected to the housing arrangement for jointly rotating around the axis of rotation by positive engagement.

9. The torque transmission arrangement according to claim 8, wherein rotational coupling members are provided at the housing arrangement that engage in rotational coupling cutouts in the piston carrying element.

10. The torque transmission arrangement according to claim 9, wherein a toothing formation is provided at the housing arrangement and a mating toothing formation is provided in a rotational coupling engagement with the toothing formation at the piston carrying element.

11. The torque transmission arrangement according to claim 8, wherein a toothing formation is provided at the housing arrangement and a mating toothing formation is provided in a rotational coupling engagement with the toothing formation at the piston carrying element.

12. The torque transmission arrangement according to claim 11, wherein the piston carrying element is constructed in its radially inner end region substantially cylindrically and with the mating toothing formation.

13. The torque transmission arrangement according to claim 7, wherein the piston carrying element is axially supported at the housing arrangement and is connected to the housing arrangement in circumferential direction by frictional engagement.

14. The torque transmission arrangement according to claim 1, wherein the torque transmission is a hydrodynamic torque converter.

* * * * *